July 9, 1940.  T. F. SCHNEIDER  2,207,443
TIRE TOOL
Filed April 4, 1938

Theodore F. Schneider
Inventor.
Delos G. Haynes
Attorney.

Patented July 9, 1940

2,207,443

UNITED STATES PATENT OFFICE 2,207,443

TIRE TOOL

Theodore F. Schneider, East St. Louis, Ill.

Application April 4, 1938, Serial No. 199,369

2 Claims. (Cl. 254—131)

This invention relates to tire tools, and with regard to certain more specific features, to a tire tool for lifting tires into place for application to automobile wheels.

Among the several objects of the invention may be noted the provision of a simple tire tool for avoiding the awkward and even dangerous tire lifting that was heretofore necessary in order to make a tire change; the provision of a tool of the class described which permits of easy and accurate alignment between hub and wheel parts as the tire is applied; and the provision of a device of the class described which may be made in portable and compact form for automobile kit use. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

Figure 1:
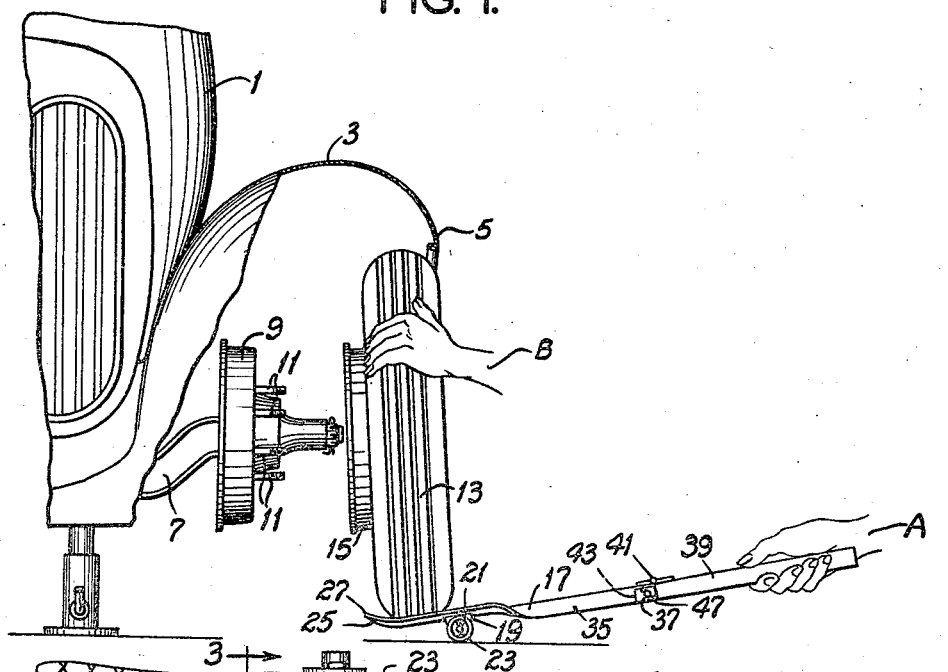
Figure 2:
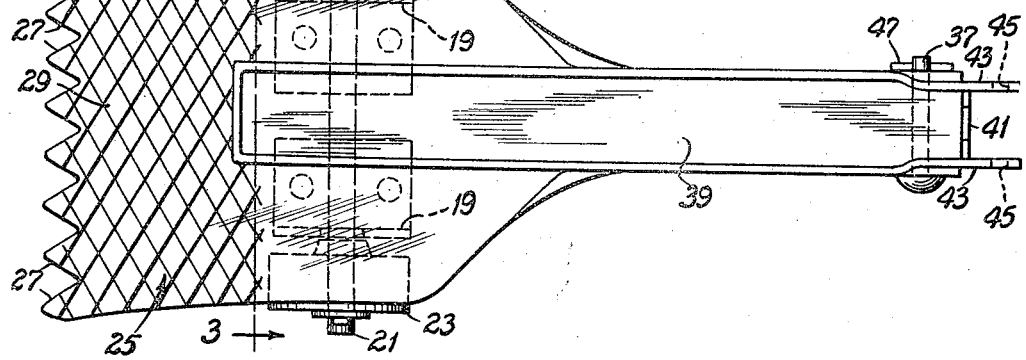
Figure 3:
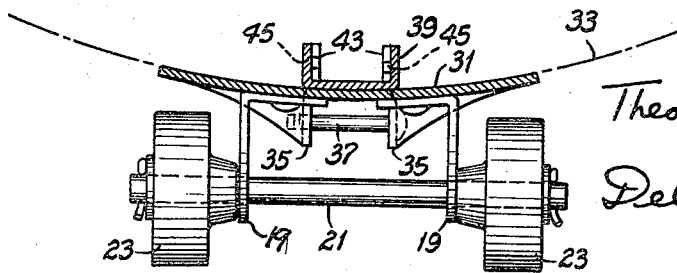

In the accompanying drawing, in which is illustrated several of various possible embodiments of the invention, Fig. 1 is a fragmentary front elevation illustrating the use of the portable form of the tool;

Fig. 2 is a plan view of the tool shown in Fig. 1 folded and ready to be placed in an automobile kit; and, Fig. 3 is a vertical section taken on line 3—3 of Fig. 2.

Similar reference characters indicate corresponding parts throughout the several views of the drawing.

Automobile tires are now generally made in forms which are heavy, and many of them are organized with wheels so that when a tire change is made, the wheel and the tire are handled as a unit. The tire weight is therefore increased by the weight of the wheel.

Furthermore, only the tire and its rim were formerly applied as a unit to the wheel and a more or less general alignment was all that was necessary to effect assembly. Now, a relatively accurate alignment must be obtained between relatively small holes in the wheel and bolts in the hub. The greater accuracy required with the increased weight makes it exceedingly difficult to make a tire change.

Added to the above, modern automobiles have fenders which include a deep overhang, requiring that a tire be first tilted to be positioned under the overhang, and then lifted into position. The required movement, in view of the weight being handled and the accuracy of alignment required, results in great difficulties of tire application, soiling of clothes, and sometimes injury to the operator.

Referring now more particularly to Fig. 1, there is shown at numeral 1 an automobile having a fender 3 with a deep overhang 5. On the axle 7 of the car is the usual rotary hub 9, with which are organized hub bolts 11. At numeral 13 is shown a tire on a wheel 15 which carries the necessary openings which are to cooperate with the bolts 11.

My invention comprises a lever 17, on the underside of which is carried a pair of lugs 19 or the equivalent. An axle 21 through the lugs supports wheel 23. Thus the lever 17 is provided with a fulcrum at the axle 21 and at the same time the tool may be easily pushed along the ground. The lever extends from its handle side beyond the fulcrum 21, where it is formed as a claw 25 which is preferably provided with serrations 27 at its front edge, and a suitable anti-skid formation 29 just behind the serrations 27.

The claw has a more or less arcuate form in cross section, as indicated at numeral 31 in Fig. 3 so as to substantially fit the arc 33 of a tire edge. It is also slightly concave, longitudinally considered, as indicated in Fig. 1.

The handle end of the lever 17 is preferably flanged downwardly as indicated at 35, and a removable pin 37 is therein provided as indicated. An extension handle 39 is hinged at 41 to the lever 17 and has ears 43 wherein are holes 45 for aligning with the pin 37 when the handle 39 is in the extended position shown in Fig. 1. By removing the pin 37, the handle 39 may be placed in the position shown in Fig. 1. The pin is then reinserted, so that the handle forms a rigid extension from the lever 17. When the tool is not in use, the pin 37 is removed and the handle 39 folds over into the position shown in Fig. 2, and the pin 37 is replaced. The pin is held in position by means of a cotter key 47.

The tool in its folded position shown in Fig. 2 may be carried in the tool kit of the automobile. When a tire change is to be made, the nuts on bolts 11 are loosened, and after the handle 39 is placed in its working position shown in Fig. 1, the tool is slipped under the tire (the car having been jacked up). The operator's one hand A operates the tool, while the other hand B balances the tire on the claw 25. The serrations 27 aid in obtaining a purchase on the rubber tire before the tire is in a position to seat on the anti-skid formation 29. It is then possible to withdraw the claw by backward motion of the hand A and at the same time to work the hand A up or down, as required, so that the tire may clear any obstructions which cause it to "hang."

After the tire (with its wheel) is off the hub, it is a simple matter to depress it as it passes under the overhang 5, and finally to roll it laterally off the claw 25 with hand B.

Likewise, the replacement tire to be applied (with its wheel) is rolled into position and may be leaned against the fender 3 at a suitable point. The tool is then pushed into position with the serrations 27 near the edge of the tire, and by a combination rolling action of the tire and lever action of the tool, it becomes easily mounted on the claw 25. Then, the hand A is advanced while the hand B adjusts the top of the tire to pass under the fender overhang 5. The tire is then pushed into position on the hub 9, the lever action on the tool being used properly to align the holes in the wheel 15 with the bolts 11, and to make such further adjustments as are necessary to prevent "hanging." Lateral motion of the hand A also gives rotary motion around a vertical axis, the respective wheels 23 rotating in opposite directions. By this means, adjustments in tire positions are further facilitated. Finally, after the wheel has been in position on the hub, it is quite easy to lift the hand A and withdraw the tool. The tool is then easily folded and replaced in the tool kit.

From the above, it will be seen that the tool provides an anti-friction means for moving the tire about according to various requirements. At the same time, the hand of the operator is not required to support the tire for making an application, and it is this requirement that results in so much trouble. Furthermore, the tire changer needs not stoop or squat into a position as was heretofore necessary in order properly to apply the body forces to lifting the tire. With the present tool, the lifting force may be applied to the tire with a mechanical advantage, without squatting, and without injury and without soiling of the opeator's clothes.

The invention not only has application to use in a tool kit for use on the road, but also in garages and the like.

It will be seen that the invention may be carried out in various materials. For example, in the drawing (Figs. 1-3), it is made of steel.

A feature of the shovel-like form of claw 25 which is shown in Figs. 1 and 2 is that if the tire happens to be in a location where there is snow, deep dust, gravel, or the like, the claw may be used as a means for clearing a track for the backward and forward movement of the wheels 5 23, or for other operations.

It will be seen that, since the axle 21 is located between the load applied by the tire and wheel (on the one hand) and the operator's hand, the mechanism employs the principle of a first-class lever.

In view of the above, it will be seen that the several objects of the invention are achieved, and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A tire tool comprising a lever, a fulcrum for the lever consisting of supporting rolling means, said lever having a relatively short concave extension from one side of the fulcrum for fitting and supporting a tire or the like and another relatively longer extension on the other side of the fulcrum, a collapsible handle hinged to said last-named extension and adapted to be moved into collapsed position with respect to said lever and at least in part parallel to the short extension, and means for locking the collapsible handle in its extended position.

2. A rubber-tire tool comprising a lever, a fulcrum for the lever consisting of supporting rolling means, said lever having one short extension from one side of the fulcrum for supporting a tire or the like, said extension having a serrated edge arcuate in cross-section adapted for purchase on a rubber tire as the tire becomes positioned on said extension, said lever having a second and longer extension on the other side of the fulcrum, a collapsible handle hinged to said second extension and adapted to be collapsed into position parallel to the short extension in connection with the said lever for storage and to be moved into extended position when in use, and means for locking the handle in its extended position.

THEODORE F. SCHNEIDER.